US012631937B2

(12) United States Patent
Fowler et al.

(10) Patent No.: US 12,631,937 B2
(45) Date of Patent: May 19, 2026

(54) OPTOELECTRONIC EMITTER WITH PHASED-ARRAY ANTENNA COMPRISING A FLARED LASER SOURCE

(71) Applicant: COMMISSARIAT A L'ENERGIE ATOMIQUE ET AUX ENERGIES ALTERNATIVES, Paris (FR)

(72) Inventors: Daivid Fowler, Grenoble Cedex (FR); Sylvain Guerber, Grenoble Cedex (FR); Benoit Charbonnier, Grenoble Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 484 days.

(21) Appl. No.: 18/547,607

(22) PCT Filed: Feb. 22, 2022

(86) PCT No.: PCT/EP2022/054402
§ 371 (c)(1),
(2) Date: Mar. 18, 2024

(87) PCT Pub. No.: WO2022/180039
PCT Pub. Date: Sep. 1, 2022

(65) Prior Publication Data
US 2024/0219806 A1 Jul. 4, 2024

(30) Foreign Application Priority Data

Feb. 24, 2021 (FR) ..................................... 21 01808

(51) Int. Cl.
*G02F 1/295* (2006.01)
*G01S 7/481* (2006.01)

(52) U.S. Cl.
CPC .......... *G02F 1/2955* (2013.01); *G01S 7/4817* (2013.01)

(58) Field of Classification Search
CPC .... G02F 1/2955; G01S 7/4817; G01S 7/4972; G01S 7/4814; G01S 7/4818; G02B 6/42; G02B 6/4212
(Continued)

(56) References Cited

U.S. PATENT DOCUMENTS

| | | | |
|---|---|---|---|
| 2012/0226118 A1* | 9/2012 | Delbeke | A61B 5/0031 600/316 |
| 2018/0217472 A1 | 8/2018 | Poulton et al. | |

(Continued)

OTHER PUBLICATIONS

International Search Report issued Jul. 1, 2022 in PCT/EP2022/054402, filed on Feb. 22, 2022, 3 pages.
(Continued)

*Primary Examiner* — Mohammed A Hasan
(74) *Attorney, Agent, or Firm* — Oblon, McClelland, Maier & Neustadt, L.L.P.

(57) ABSTRACT

A phased-array optoelectronic emitter includes a laser chip containing a flared laser source and a photonic chip containing phase shifters and elementary transmitters placed in N arms. The photonic chip includes a coupler that ensures optical coupling between the flared laser source and the arms, the coupler having a collection input placed facing the emission surface of the flared laser source and a transmission output comprising N rectilinear waveguides that are coupled to the N arms of the optoelectronic emitter and that are oriented so that their longitudinal axes are secant at a position located in a flared section of the laser source on an optical axis of the laser source.

9 Claims, 4 Drawing Sheets

(58) Field of Classification Search
     USPC ........................................................... 359/315
     See application file for complete search history.

(56)                    References Cited

U.S. PATENT DOCUMENTS

2018/0348592 A1*  12/2018  Hosseini ................. G01S 17/42
2022/0216922 A1*   7/2022  Hashemi ............. H04B 10/548

OTHER PUBLICATIONS

Guo et al. "InP Photonic Integrated Circuit with On-chip Tunable Laser Source for 2D Optical Beam Steering", Optical Fiber Communication Conference and Exposition and the National Fiber Optic Engineers Conference (OFC/NFOEC), 2013, IEEE, Mar. 17, 2013, 3 pages.
Hulme et al. "Fully integrated hybrid silicon two-dimensional beam scanner" Optics Express, vol. 23, No. 5, Feb. 25, 2015, 14 pages.
Wenzel et al. "High-brightness diode lasers", C.R. Physique 4 (2003), pp. 649-661.
Delepine et al. "How to Launch 1 W Into Single-Mode Fiber from a Single 1.48-μm Flared Resonator", IEEE Journal on Selected Topics in Quantum Electronics, vol. 7, No. 2, Mar./Apr. 2001, 13 pages.
Heck "Highly integrated optical phased arrays: photonic integrated circuits for optical beam shaping and beam steering", Nanophotonics 2017; 6(1): pp. 93-107.

* cited by examiner 10  11        2                    20   21

12

1

30        24        25

12

1

30        24        25

12

1

30        24        25

X
Y  Z

OPTOELECTRONIC EMITTER WITH PHASED-ARRAY ANTENNA COMPRISING A FLARED LASER SOURCE

TECHNICAL FIELD

The field of the invention is that of on-chip photonic circuits, and more precisely that of phased-array optoelectronic emitters produced on at least one photonic chip. The invention is notably applicable to the field of LIDARs (LIDAR standing for light detection and ranging).

PRIOR ART

Optoelectronic emitters employing OPA technology (OPA standing for optical phased array) are optoelectronic devices that allow a monochromatic light beam to be emitted into free space directionally. They are notably applicable in the field of laser-based light detection and ranging (LIDAR), but also in the field of free-space optical communications, of holographic screens and of medical imaging.

FIG. 1A schematically illustrates the operating principle of such an optoelectronic emitter 1. A laser source 3 emits an optical signal that is distributed by a power divider 4 to N arms 5 of the optoelectronic emitter 1. Each arm 5 comprises one phase shifter 6 and one elementary transmitter 7, also called an optical antenna. Each elementary transmitter 7 transmits an optical signal into free space, for example via diffraction, the optical signals then combining through interference to form a light beam. The latter has a far-field transmission pattern that is notably determined by the relative phase $\Delta\varphi$ applied by the phase shifters to the optical signals propagating through the arms.

Such optoelectronic emitters can be produced using integrated photonics, namely their various optical components (waveguides, power divider, elementary transmitters, etc.) are produced on and from the same photonic chip.

In this respect, FIG. 1B schematically and partially illustrates one example of such an optoelectronic emitter 1, as described in the article by Hulme et al. titled *Fully integrated hybrid silicon two dimensional beam scanner*, Opt. Express 23 (5), 5861-5874 (2015). This optoelectronic emitter 1 comprises a laser source 3, here of the III-V type, and is produced on the same photonic chip. It therefore comprises a semiconductor laser source 3, the power divider 4, the phase shifters 6 and the elementary transmitters 7. In this example, the laser source 3 is produced by transferring a III-V material to the photonic chip (of the SOI type), then by structuring that material to form the gain medium.

However, there is a need to provide an optoelectronic emitter such as this one comprising a high-power laser source. Specifically, notably in the context of distance estimation (LIDAR application), the optical power of the signal backscattered by the scene is only a small fraction of the optical power of the emitted optical signal. It may then be necessary to use a high-power laser source to detect distant objects. However, generation of a light beam of high optical power in a waveguide of small dimensions of the optical cavity of the laser source would lead to gain saturation, or even to deterioration of the gain medium. Moreover, although use of a laser source having a very wide optical cavity would allow a high-power light beam to be generated, the generated beam would be of mediocre quality since the waveguide in the optical cavity would then no longer be single-mode.

In addition, document US2018/0217472 A1 and the article by Guo et al. titled InP Photonic Integrated Circuit with on-chip Tunable Laser Source for 2D Optical Beam Steering, Optical Fiber Communication Conference/National Fiber Optic Engineers Conference 2013, OSA Technical Digest (online) (Optical Society of America, 2013), paper OTh3I.7, describe examples of such an optoelectronic emitter comprising a laser chip coupled to a photonic chip.

SUMMARY OF THE INVENTION

The objective of the invention is to remedy at least some of the drawbacks of the prior art, and more particularly to provide an on-chip phased-array optoelectronic emitter comprising a laser source capable of emitting a high-power optical signal of good quality, the laser source then being optically coupled to the array of elementary transmitters efficiently.

To do this, the subject of the invention is a phased-array optoelectronic emitter, comprising a photonic chip, comprising N waveguides forming arms of the optoelectronic emitter, with N>1; and a plurality of phase shifters and of elementary transmitters placed in the arms.

According to the invention, the optoelectronic emitter comprises a laser chip, which is distinct from the photonic chip, which is joined to the latter in a coplanar manner and which comprises a flared laser source. The flared laser source is formed of a straight single-mode section and of a section that is flared in a main plane, and that extends along an optical axis $\Delta$ and ends in a surface for emission of an optical signal. In addition, the flared laser source is configured to emit the optical signal, a wavefront of which is circular in the main plane and centered on a position $z_j$ located in the flared section on the optical axis $\Delta$.

In addition, according to the invention, the photonic chip comprises a coupler, ensuring optical coupling to the flared laser source for collecting and transmitting at least one portion of the emitted optical signal, comprising: a collection input placed facing the emission surface of the flared laser source, and a transmission output comprising N rectilinear waveguides that are coupled to the N arms of the optoelectronic emitter and that are oriented so that their longitudinal axes are secant at the position $z_j$.

The following are certain preferred but non-limiting aspects of this optoelectronic emitter.

Each of the N rectilinear waveguides may have an upstream end oriented toward the collection input and an opposite downstream end. The downstream ends may define the transmission output of the coupler and may be arranged laterally in a circular arc with a center of the radius of the arc located at the position $z_j$.

The coupler may be a star coupler comprising: a free propagation region made of a medium of uniform refractive index, having an entrance face forming the collection input and coupled to the emission surface of the flared laser source, and an exit face that is circularly arcuate and the center of the radius of the arc of which is located at the position $z_j$; and the rectilinear waveguides are output waveguides, each connected to the exit face on the one hand and to the N arms on the other hand, that are rectilinear and oriented longitudinally in the direction of the position $z_j$, the downstream ends of these output waveguides being arranged laterally along a line forming the transmission output that is circularly arcuate with a center of the radius of the arc located at the position $z_j$.

The output waveguides may be tapered waveguides, and have a width that decreases from the exit face of the free propagation region.

The rectilinear waveguides may be rectilinear tapered waveguides that are oriented longitudinally in the direction of the position $z_l$, and that are arranged laterally so that their upstream ends are placed along a line forming the collection input and their downstream ends are placed along a line forming the transmission output, the collection input and transmission output being circularly arcuate with a center of the radius of the arc located at the position $z_l$.

The photonic chip may be spaced apart from the laser chip along the optical axis Δ by a value less than or equal to 1 μm. They may be joined to each other by an adhesive layer.

The arms may be rectilinear and parallel to one another, and be connected to the transmission output by connecting segments of various lengths.

The photonic chip may be made from an SOI substrate.

BRIEF DESCRIPTION OF THE DRAWINGS

Other aspects, aims, advantages and features of the invention will become more clearly apparent on reading the following detailed description of preferred embodiments thereof, this description being given by way of non-limiting example and with reference to the appended drawings, in which.

DETAILED DESCRIPTION OF PARTICULAR EMBODIMENTS

In the figures and in the remainder of the description, the same references have been used to designate identical or similar elements. In addition, the various elements have not been shown to scale for the sake of clarity of the figures. Moreover, the various embodiments and variants are not mutually exclusive and may be combined with one another. Unless indicated otherwise, the terms "substantially", "about" and "of the order of" mean to within 10%, and preferably to within 5%. Moreover, the terms "comprised between . . . and . . . " and equivalents mean inclusive of limits, unless indicated otherwise.

The invention relates to a phased-array optoelectronic emitter comprising a flared laser source. Such an optoelectronic emitter comprises a photonic chip on which all the phase shifters and elementary transmitters are produced, and a laser chip, which is distinct from the photonic chip, which is joined to the latter in a coplanar manner, and on which the flared laser source is produced.

The optoelectronic emitter is designed to emit a light beam the intensity of which has, in the far field, a determined angular distribution around a main emission axis. This far-field angular distribution of the light beam emitted by the optoelectronic emitter is called the 'far-field emission pattern'. It thus differs from the near-field emission patterns of elementary transmitters (optical antennas). The far field (or Fraunhofer zone) corresponds to a distance D greater than the ratio of the square of a large dimension of the elementary transmitter (here, the length $L_{ee}$ along the Z-axis) to the emission wavelength $\lambda_e$, or in other words: $D > 2L_{ee}^2/\lambda_e$.

Moreover, the flared laser source may be of the type notably described in the article by Wenzel et al. titled *High-brightness diode lasers*, C.R. Physique 4 (2003), 649-661. It comprises (located in the optical cavity) an active waveguide formed from a straight single-mode section followed by a flared section that ends in an emission surface of the laser source. The straight single-mode section may be a ridge section of small transverse dimensions, so as to form a spatial filter and to force the optical signal to be transverse single-mode, and the flared section may ensure the amplification of the optical signal. The emission surface of the flared laser source may then have a width of the order of one micron to several hundred microns. Such a flared laser source may thus emit an optical signal of high power, of the order of several watts for example.

According to the invention, the photonic chip comprises a coupler that performs the function of optical coupling between the flared laser source and the N arms comprising the phase shifters and the elementary transmitters, and the function of power division.

Figure 1A:
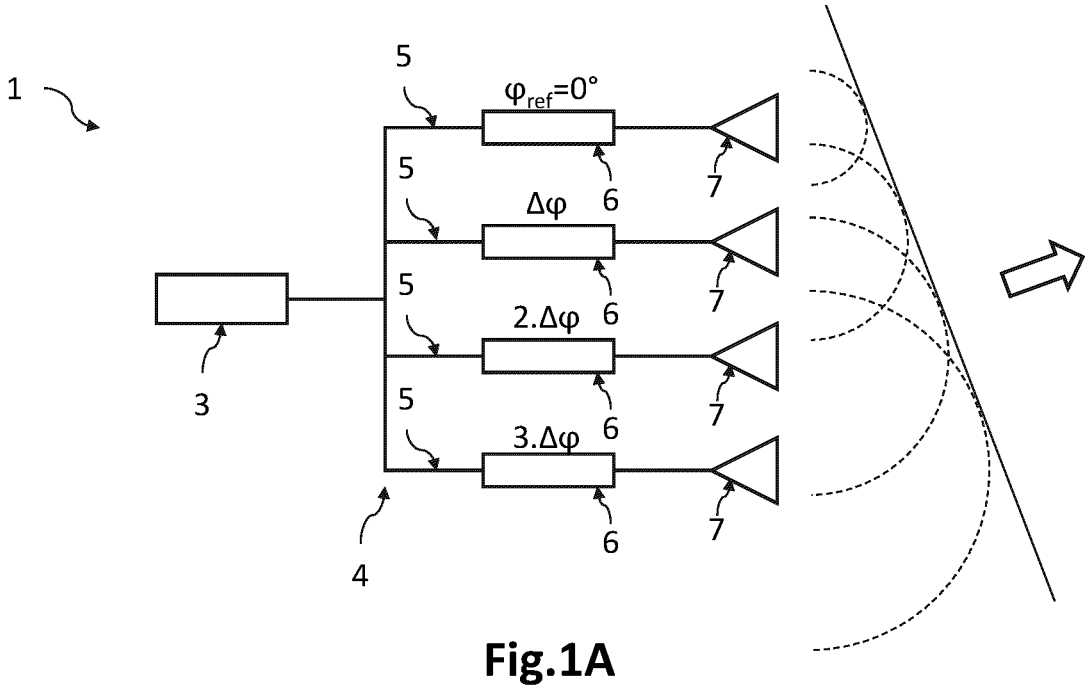
FIG. 1A, which has already been described, is a schematic and partial view of an optoelectronic emitter according to one example of the prior art.
Figure 1B:
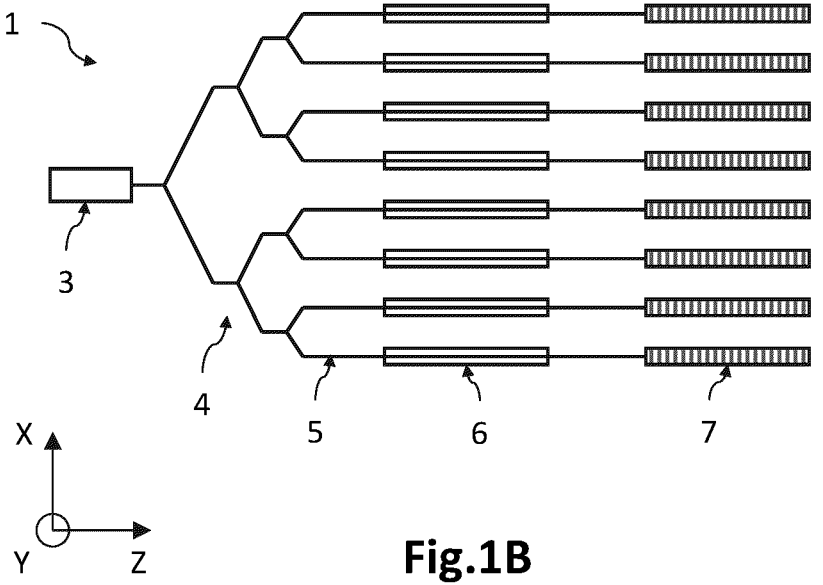
FIG. 1B, which has already been described, is a schematic and partial top view of an optoelectronic emitter produced on the same photonic chip, according to one example of the prior art.
Figure 2A:
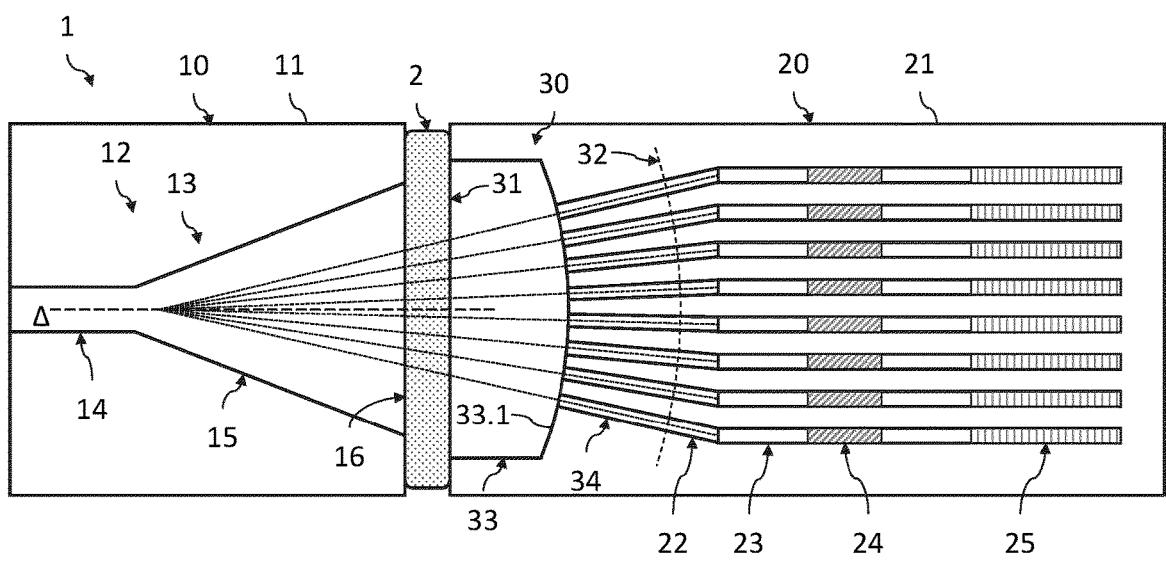
FIG. 2A is a schematic and partial top view of an optoelectronic emitter according to one embodiment, in which the coupler is a star coupler.

FIG. 2A is a schematic and partial view of an optoelectronic emitter 1 according to one embodiment, in which the laser chip 10 is optically coupled in a coplanar manner to the photonic chip 20.

A direct orthonormal coordinate system XYZ, in which the XZ-plane is parallel to the main plane of the laser chip 10 and of the photonic chip 20, and in which the longitudinal Z-axis is oriented along the optical axis Δ of the flared laser source 12, is defined here and will be referred to in the rest of the description. The X-axis is called the horizontal axis, and the Y-axis is called the vertical axis. The terms "upstream" and "downstream" refer to positions of increasing distance in the direction of propagation of the optical signal, here in the +Z-direction.

The laser chip 10 is distinct from the photonic chip 20 and comprises the flared laser source 12. The latter is designed to emit a pulsed or continuous-wave monochromatic optical signal, of wavelength $\lambda_e$ for example equal to about 905 nm, or even to 1550 nm. It is said to be flared in the sense that the active waveguide 13 located in the optical cavity comprises, along an optical axis Δ, a straight single-mode section 14 followed by a flared section 15 that ends in an emission surface 16. Thus, the spatial distribution in an XY-plane of the intensity of the emitted optical signal is elliptical and 'flattened': it has, in the near-field, a small dimension along the vertical Y-axis, for example one of the order of one micron, and a large dimension along the horizontal X-axis, for example one of the order of about one hundred microns, with an aspect ratio (large dimension to small dimension) of the order of 50 to 100, or even more. The flared laser source 12 may be made in the same way or a way similar to the one described in the article by Delepine et al. titled *How to Launch* 1 *W Into Single-Mode Fiber from a Single* 1.48 μm *Flared Resonator*, IEEE Journal on Selected Topics in Quantum Electronics, Vol. 7, No. 2, (2001), 111-123.

It comprises a carrier substrate 11 on which rests an active layer (not shown) comprising multiple quantum wells that lie in the XZ-plane. The active layer may be flanked, along the vertical Y-axis, by confinement layers. A structured upper layer covers the active layer, in which a waveguide referred to as the active waveguide is formed and extends along the optical axis Δ.

This active waveguide 13 comprises a straight single-mode ridge section 14 that is defined laterally in the XZ-plane by localized etching. This straight single-mode section 14 has transverse dimensions such that a single guided transverse optical mode, for example the fundamental transverse mode, is supported at the emission wavelength $\Delta_e$. Moreover, the straight single-mode section 14 performs a modal filtering function insofar as transverse modes of higher orders potentially excited in the flared section 15 are unable to be guided in the straight single-mode section 14.

It also comprises a flared section 15, defined in the XZ-plane of the upper layer by localized doping. The optical mode is then guided therein via the amplifying gain. The section 15 is said to be flared insofar as it has a width, in the XZ-plane, that increases here linearly with distance from the straight single-mode section 14. It may have an angle of inclination with respect to the optical axis Δ of the order of a few degrees, and for example comprised between about 4° and 6°. The flared section 15 delineates the emission surface 16 of the flared laser source 12, which lies orthogonally to the optical axis Δ. The emission surface 16 then has a width $w_l$, here along the horizontal X-axis, of the order of one to several hundred microns.

It wig be noted that a flared laser source 12 is intrinsically astigmatic, in the sense that the plane of the horizontal waist (i.e. the waist in the XZ-plane) is located at a different position to the plane of the vertical waist (i.e. the waist in the YZ-plane). As known, the plane of the waist of a laser source is located in a position in which the (horizontal or vertical) wavefront in question is planar (infinite radius of curvature). As notably indicated in the article by Delepine et al. 2001, the plane of the horizontal waist is located in the active waveguide 13, and more precisely in the flared section 15, at a position $z_l$ distant from the emission surface 16 by a non-zero value $\delta_l$ along the optical axis Δ, whereas the plane of the vertical waist is located on the emission surface 16 ($\delta_l=0$). The distance $\delta_l$ (and therefore the position $z_l$) may be determined using a wavefront analyzer.

Thus, the emitted optical signal has, in the XZ-plane, i.e. in the main plane of the laser chip 10 and the main plane of the photonic chip 20, a circular wavefront the center of which is located at the position $z_l$. In other words, in the XZ-plane, the optical signal emitted by the flared laser source 12 seems to be emitted from the position $z_l$.

The photonic chip 20 comprises the N arms 23 of the optoelectronic emitter 1, in which arms the phase shifters 24 and the elementary transmitters 25 are located. It is distinct from the laser chip 10 in the sense that these two chips comprise their own carrier substrate 11, 21. It further comprises an integrated coupler 30 (produced on the photonic chip 20) which ensures, on the one hand, optical coupling to the laser chip 10 and, on the other hand, division of the power of the received optical signal between the N arms 23.

The photonic chip 20 or photonic integrated circuit (PIC) comprises a carrier substrate 21 from which may be produced active photonic components (modulators, diodes, etc.) and passive photonic components (waveguides, multiplexers or demultiplexers, etc.) that are optically coupled to one another. In the context of on-silicon photonics, the carrier substrate 21 and the photonic components are made based on silicon. The carrier substrate 21 may thus be a silicon-on-insulator (SOI) substrate. However, many other technological platforms may be used. Typically, the use of waveguides made of silicon for applications at 905 nm is not recommendable since silicon absorbs at this frequency. Silicon nitride (SiN), aluminum nitride (AlN), guides made of doped silicon, etc. will for example therefore possibly be used.

The photonic chip 20 has a first lateral face located facing the emission surface 16 of the laser chip 10, so that the coupler 30 may collect a substantial portion of the optical signal emitted by the flared laser source 12. The laser chip 10 and the photonic chip 20 are assembled in a coplanar manner, in the sense that the optical signal propagates in the same XZ-plane to pass from the laser chip 10 to the photonic chip 20.

They are here joined to each other by a layer 2 of an adhesive material, such as an optical adhesive, the refractive index of which is chosen so as to not disrupt the propagation of the optical signal. The chips 10, 20 are therefore not optically coupled to each other by passive optical elements such as lenses. The refractive index of the optical adhesive 2 may be identical to that of the cladding material of the waveguides of the coupler 30. By way of example, the coupler 30 and the waveguides of the arms 23 may be made of a silicon nitride and the cladding of a silicon oxide. In addition, the spacing between the laser chip 10 and the photonic chip 20 along the longitudinal Z-axis is preferably less than 1 μm, so as to collect a maximum of the optical signal emitted by the flared laser source 12 (insofar as the signal diverges). The adhesive layer 2 may however not be used, and the emitted optical signal may be transmitted into the air between the two chips. In any case, the optoelectronic emitter 1 is then very compact, and coupling efficiency cannot be impacted by errors in the relative positioning of the passive optical elements that would otherwise have been required, in particular positioning errors along the X-axis.

The coupler 30 is configured to collect at least one portion of the optical signal emitted by the flared laser source 12 and to transmit it into the N arms 23. Generally, the coupler 30 comprises a collection input 31 for collecting the incident optical signal, and a transmission output 32 for transmitting the collected optical signal, the N arms 23 being coupled to said transmission output.

The collection input 31 has transverse dimensions in the XY-plane that preferably have an aspect ratio at least of the same order of magnitude as that of the spatial distribution of the intensity of the emitted optical signal. More precisely, the collection input 31 has, along the vertical Y-axis, a height corresponding to the thickness of a guiding layer of the photonic layer in which the coupler 30 and the waveguides of the arms 23 are produced, which for example is of the order of one micron (from a few tens of nanometers to a few microns), and a width along the horizontal X-axis of the order of one to several hundred microns. Thus, the coupler 30 is able to receive a substantial portion of the emitted optical signal.

Moreover, the transmission output 32 comprises N rectilinear waveguides that are coupled to the N arms 23 of the optoelectronic emitter 1 and that are oriented so that their longitudinal axes are secant at the position $z_l$ (to within manufacturing tolerances). The rectilinear waveguides may be the output waveguides 34 illustrated in FIGS. 2A to 2C, or the tapered waveguides 35 illustrated in FIG. 3. This longitudinal orientation of the N rectilinear waveguides makes it possible to optimize the collection efficiency of the emitted optical signal.

The N rectilinear waveguides each have an upstream end oriented toward the collection input 31 and an opposite downstream end. Preferably, the downstream ends of the rectilinear waveguides define the transmission output 32, and are arranged laterally (i.e. along the X-axis) in a circular arc with a center of the radius of the arc located at the position $z_l$, this allowing the efficiency of transmission of the collected optical signal in the direction of the arms 23 of the optoelectronic emitter 1 to be optimized.

Figure 2B:
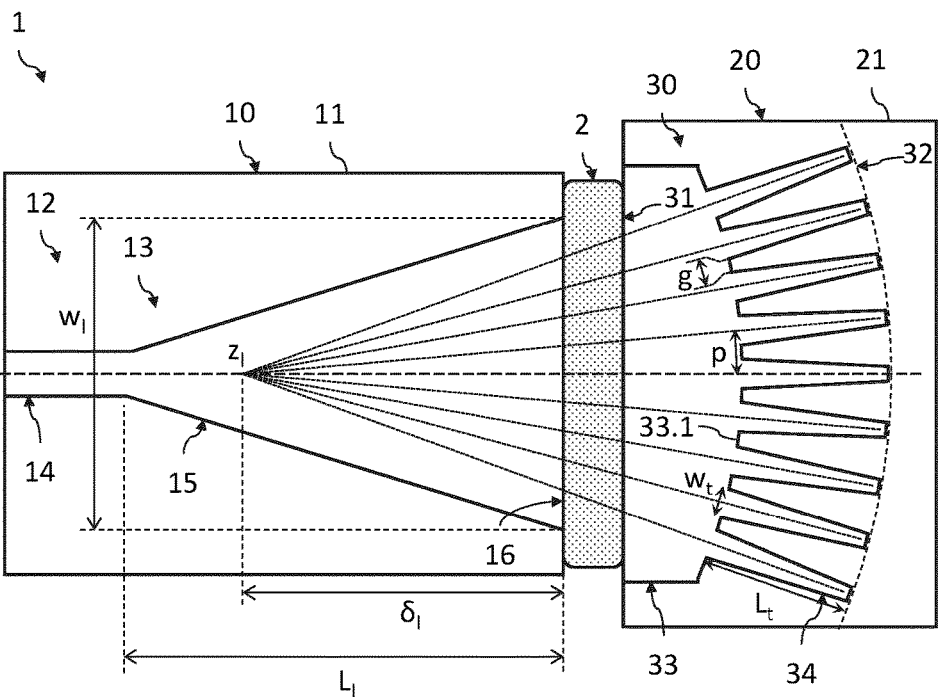
FIG. 2B is a top view illustrating in more detail the laser chip and the coupler of the optoelectronic emitter of FIG. 2A.
Figure 2B:
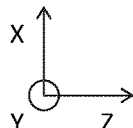
Figure 2C:
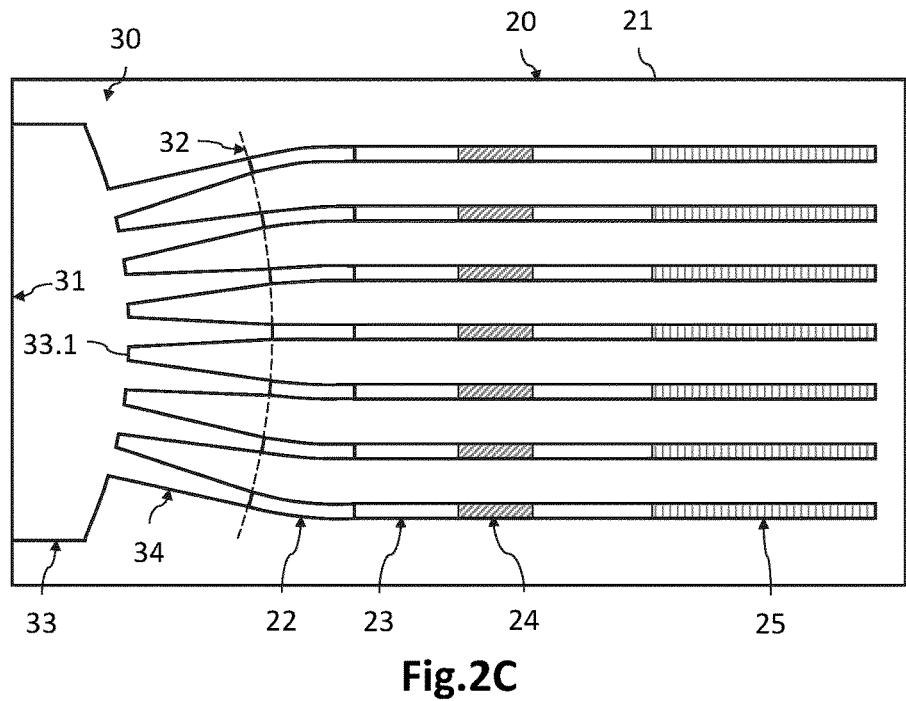
FIG. 2C is a top view illustrating in more detail the photonic chip of the optoelectronic emitter of FIG. 2A.

In the example of FIGS. 2A to 2C, the transmission output 32 is circularly arcuate with a center of the radius of the arc located substantially at the position $z_l$. Thus, the output of the coupler 30 has a curvature that coincides with the curvature of the wavefront of the optical signal emitted by the flared laser source 12 and received by the coupler 30. Thus, as indicated above, the transmission efficiency of the collected optical signal is optimized (in addition to the fact that the collection efficiency of the emitted optical signal is optimized), and introduction of a phase error into the transmitted optical signal is also avoided (phase errors may however be corrected by the phase shifters 24). The slight difference between the wavefront of the optical signal emitted by the source and the wavefront of the optical signal received by the coupler 30, due to the difference between the refractive index of the material of the active layer of the flared laser source 12 and the material of the coupler 30, may be taken into account here.

In this embodiment, the coupler 30 is a star coupler. It comprises a free propagation region 33 (FPR) and output waveguides 34. The collection input 31 is here an entrance face of the FPR 33, which is here orthogonal to the optical axis Δ and located facing the flared laser source 12. It may have a longitudinal dimension along the X-axis greater than that of the emission surface 16. The transmission output 32 is here formed by the downstream ends of the output waveguides 34 and is circularly arcuate, the center of the radius of the arc of which is positioned at the position $z_l$ of the flared laser source 12. The FPR 33 is formed by a medium of uniform refractive index and is bounded, along the optical axis Δ, by the collection input 31 and by an exit face 33.1 to which the output waveguides 34 are coupled. The exit face 33.1 is also circularly arcuate, the center of the radius of the arc of which is also positioned at the position $z_l$ of the flared laser source 12. The coupler 30 therefore comprises N output waveguides 34, which are dimensioned to optimize collection of the emitted optical signal, then transmission of the collected optical signal, and which are preferably geometrically identical to one another. In FIG. 2A, they extend from the exit face 33.1 of the FPR 33 to the dashed circularly arcuate line that illustrates the transmission output 32.

The N output waveguides 34 transmit the collected optical signal to the N waveguides of the arms 23. They are connected to the arms 23 by connecting segments 22, as illustrated in more detail in FIG. 2C. Here they are tapered waveguides with a width in the XY-plane that decreases adiabatically in the direction of propagation of the optical signal, so as to optimize the transmission efficiency of the coupler 30. The width may thus decrease monotonically, or even linearly. As illustrated in FIG. 2B, they all have identical dimensions, in terms of length $L_t$ and of transverse dimensions $w_t(z)$. They are rectilinear and are each oriented longitudinally in the direction of the position $z_l$ of the flared laser source 12. The upstream ends of the output waveguides 34, and the downstream ends, are arranged laterally (in the XZ-plane and along the X-axis) along a circular arc center of the radius of the arc of which is located at the position $z_l$. The upstream ends of the output waveguides 34 are connected to the circularly arcuate exit face 33.1 of the FPR 33, and the downstream ends of the output waveguides 34 are located on the transmission output 32 illustrated by the circularly arcuate line centered on the position $z_l$.

By way of example, as illustrated in FIG. 28, which is a schematic and partial top view illustrating in detail the flared laser source 12 and the coupler 30, the flared laser source 12 may emit an optical signal at a wavelength $\lambda_e$ equal to 905 nm. The flared section 15 has a length $L_l$ of 2000 μm and a maximum width $w_l$ of 150 μm at the emission surface 16. The flared laser source 12 here has an astigmatism such that the distance $\delta_l$ is equal to about 600 μm. The coupler 30 here comprises 100 output waveguides 34 produced in the 0.3 μm thick silicon-nitride guiding layer, and arranged at the exit face of the FPR 33 with a pitch P along the X-axis equal to about 1.3 μm. Each output waveguide 34 has a length $L_t$ of 100 μm and a maximum width $w_t$ of 1.2 μm at its upstream end. The upstream ends are spaced apart from one another by a spacing g equal to about 0.1 μm. Under these conditions, at least 90% of the emitted optical signal is collected and transmitted into the output waveguides 34.

) Thus, the coupler 30 has a high collection and transmission efficiency insofar as the output waveguides 34 are rectilinear and oriented longitudinally toward the position $z_l$ and insofar as the transmission output 32 is circularly arcuate and has its center at the position $z_l$, i.e. it has a curvature substantially identical to that of the wavefront of the emitted optical signal. Introduction of phase errors into the optical signals transmitted by the various output waveguides 34 (which phase errors may nevertheless be corrected by the phase shifters 24) is also avoided, and transmission efficiency is optimized. Moreover, the collection input 31 of the coupler 30 advantageously has transverse (horizontal along the X-axis, and vertical along the Y-axis) dimensions at least of the same order of magnitude as those of the spatial distribution in the XY-plane of the intensity of the emitted optical signal, thus improving collection efficiency. It will also be noted that such a coupler 30 (that of FIG. 2A or that of FIG. 3) ensures the intensity distribution in the arms 23 is of Gaussian form and not an equal distribution from one arm to the next. This Gaussian distribution makes it possible to eliminate the side lobes of the far-field intensity distribution of the light beam emitted by the optoelectronic emitter 1. Specifically, equal distribution results in a far-field intensity distribution having the form of a sinc function.

The coupler 30 therefore performs the function of dividing the power of the collected optical signal between the N arms 23. The output waveguides 34 are connected to the N arms 23 by connecting segments 22. Insofar as the N arms 23 are here preferably rectilinear and parallel to one another, the connecting segments 22 are curved (except the one that is in the extension of the optical axis Δ) and have a length that differs from one connecting segment to the next. It will be noted that the connecting segments 22 and the arms 23 may have the same width, equal to that of the output waveguides 34 at their downstream end. As indicated below, the phase shift introduced by the connecting segments 22 is corrected by the phase shifters 24.

The optoelectronic emitter 1 also comprises a set of phase shifters 24 and of elementary transmitters 25. More precisely, at least some of the arms 23 are equipped with at least one phase shifter 24 designed to modify the phase of the optical signal propagating through the arm 23 in question, and thus to generate a phase difference Δφ, or relative phase, between optical signals propagating through adjacent arms 23. The phase shifters 24 are placed between the coupler 30 and the elementary transmitters 25. Each arm 23 may be equipped with a phase shifter, or only some of the arms 23 may be equipped therewith, such as for example one arm 23 in two. In addition, the reference arm 23 need not comprise any phase shifters 24.

The phase shifters 24 may be phase shifters that employ an electro-refractive effect or a thermo-optical effect. In both cases, the modification of the phase is obtained by modifying the refractive index of the material forming the core of the waveguide in question. This modification of the refractive index may be obtained by modifying free-carrier density in the case of an electro-refractive phase shifter 24, or by modifying the applied temperature in the case of a thermo-optical phase shifter 24.

The phase shifters 24 are preferably configured to apply the same relative phase value Δφ to the optical signals propagating through the arms 23, so as to obtain a determined non-zero angle θ made by the inclination of the main emission axis to the Y-axis in the XY-plane (orthogonal to the axis of the elementary transmitters 25). However, the relative phase Δφ may not be identical between the arms 23, either to obtain a different far-field pattern, or to take account of and to compensate for any phase errors. These phase errors may be caused by degradation over time of certain components of the optoelectronic emitter 1, by non-uniformities in the manufacturing process, by non-zero tolerances in the manufacturing process, and/or by the impact of the environment of the optoelectronic emitter 1 (e.g. potential effect of the packaging containing the elementary transmitters 25).

It will be noted here that the phase shifters 24 may therefore correct the undesirable phase shift introduced by the connecting segments 22 (as a result of their length differing from one segment to another). This correction may have been calibrated in a prior step of calibration of the optoelectronic emitter.

The optoelectronic emitter 1 comprises N elementary transmitters 25, or optical antennas, coupled to the arms 23, and therefore placed downstream of the phase shifters 24. The relative phase Δφ between the optical signals emitted by the elementary transmitters 25 notably determines the value of the angle θ made by the main emission axis of the light beam in the far field to the Y-axis in the XY-plane of the optoelectronic emitter 1.

The elementary transmitters 25 are here diffraction gratings formed in the waveguides of the arms 23. They extend along the Z-axis parallel to one another and are aligned along the X-axis: in other words, their first ends have the same position along the Z-axis, as do their second ends. They are spaced apart from one another by a distance preferably comprised between $\lambda_e/2$ and $2\lambda_e$. For information purposes, the number N of elementary transmitters 25 may range from about ten to about ten thousand.

Thus, the optical signals propagating through the arms 23 are partly transmitted into free space via diffraction by the elementary transmitters 25. The extracted optical signals propagate through free space, recombine through interference, and thus form in the far field the light beam emitted by the optoelectronic emitter 1, the angular distribution of which around the main emission axis is determined and defines the far-field emission pattern of the optoelectronic emitter 1.

The angle θ made by the main emission axis to the Y-axis in the YZ-plane depends, as is known, on the emission wavelength $\lambda_e$ of the flared laser source 12 and on the period Λ of the diffraction grating that the elementary transmitters 25 form. As indicated above, the angle θ of the main emission axis with respect to the Y-axis in the XY-plane depends on the value of the relative phase Δφ applied by the phase shifters 24 to the optical signals propagating through the arms 23. It is generally desired for a zero relative phase Δφ to result in a zero angle θ, i.e. for the main emission axis of the light beam in the far field to be parallel to the Y-axis. This is generally determined in a prior step of calibration of the optoelectronic emitter.

It will be noted that it may be desired to connect the phase shifters 24 to a control device (not shown) suitable for calibrating and controlling the phase shifters depending on the actual far-field emission pattern of the optoelectronic emitter. Depending on the control signals sent by the control device, the phase shifters 24 may generate a predetermined relative phase Δφ in the optical signals propagating through the various arms 23, so as to obtain the desired far-field emission pattern. The control device may be formed of an interferometric focusing lens, of a plurality of photodetectors and of a control module, as described in international application PCT/EP2020/087385 filed on Dec. 21, 2020.

Figure 3:
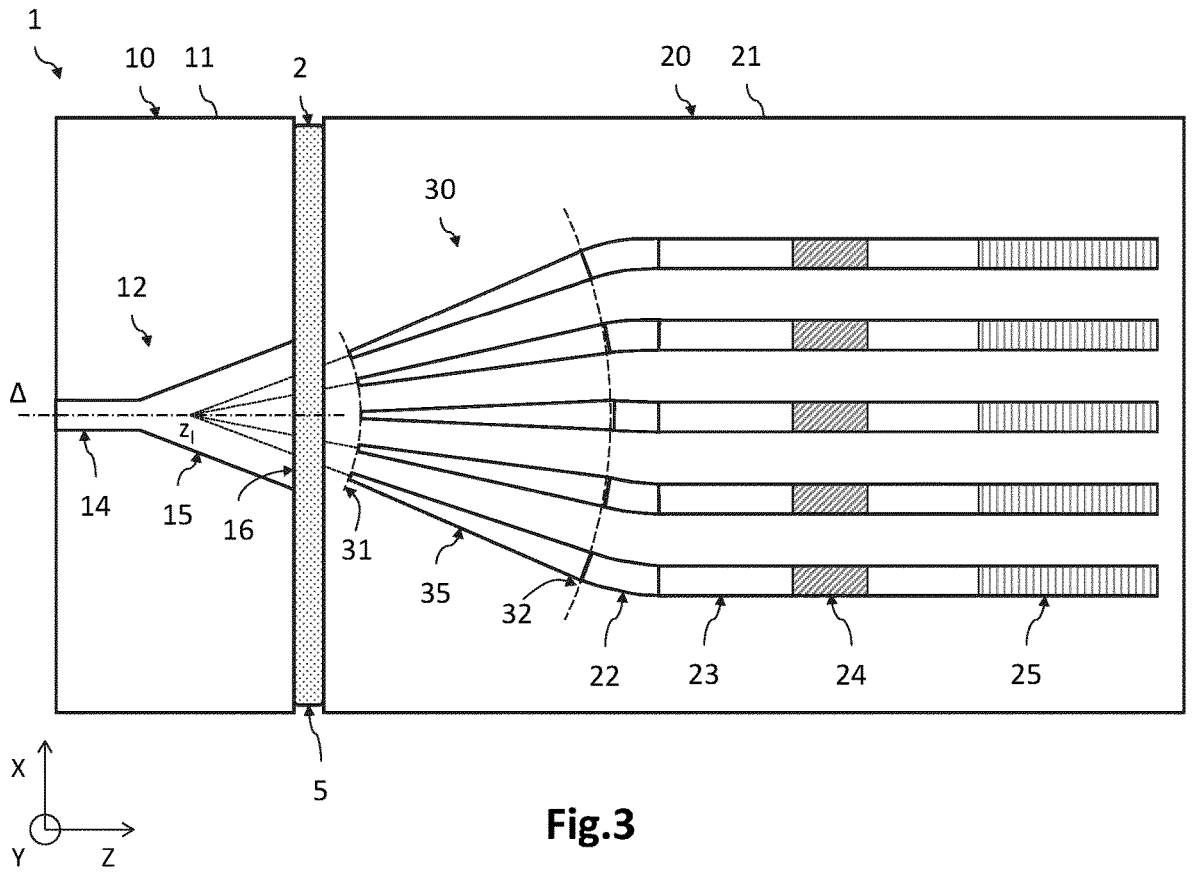
FIG. 3 is a schematic and partial top view of an optoelectronic emitter according to one variant of embodiment, in which the coupler is formed from tapered waveguides.

FIG. 3 is a schematic and partial top view of an optoelectronic emitter 1 comprising a coupler 30 according to one variant of embodiment. In this example, the coupler 30 is formed of an array of tapered waveguides 35, which have an adiabatic variation in their width. Unlike the output waveguides 34 connected to the FPR 33 (FIG. 2A), the width of the tapered waveguides 35 here increases in the direction of the optical signal. In addition, the coupler 30 does not have an FPR, and hence the upstream and downstream ends of the tapered waveguides 35 form the collection input 31 and the transmission output 32 of the coupler 30, respectively. The tapered waveguides 35 are rectilinear and oriented longitudinally toward the position $z_l$. The upstream ends are placed laterally on a first line that is circularly arcuate in the XZ-plane, the circular arc being centered on the position $z_l$ and the downstream ends are likewise placed laterally on a second line that is circularly arcuate in the XZ-plane, the circular arc being centered on the position $z_l$. The tapered waveguides 35 therefore have the same length. As in the example in FIG. 2A, the number of tapered waveguides 35, their width and length, their lateral arrangement, etc. may be determined so as to optimize coupling efficiency and transmission efficiency.

Figure 4:
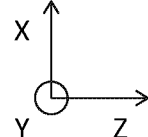
FIG. 4 is a schematic and partial top view of a structure comprising a plurality of optoelectronic emitters produced on the same laser and photonic chips.

FIG. 4 is a schematic and partial top view of a structure comprising a plurality of optoelectronic emitters 1, arranged laterally next to one another. Thus, the laser chip comprises a plurality of flared laser sources 12, each oriented along optical axes parallel to one another, and produced on the same carrier substrate 11. The flared laser sources 12 are preferably identical to one another. The photonic chip 20 comprises a plurality of sets of couplers 30, phase shifters 24 and elementary transmitters 25, each set being optically coupled to one flared laser source 12. These sets are produced on the same carrier substrate 21.

This structure is made possible by the compactness of the optoelectronic emitters 1. In addition, the elliptical shape of the optical signals emitted by the flared laser sources 12 allows the constraints in respect of alignment of the two chips to be reduced, while maintaining coupling of particularly high efficiency between the flared laser sources 12 and the couplers 30. This structure thus allows the scene to be scanned in two dimensions, without using particularly expensive tunable laser sources. Specifically, each optoelectronic emitter 1 may be configured to scan the scene in a different angular plane.

Particular embodiments have just been described. Various modifications and variants will appear obvious to anyone skilled in the art.

The invention claimed is:

1. A phased-array optoelectronic emitter, comprising:

a photonic chip, comprising:

N waveguides forming arms of the optoelectronic emitter, with N>1; and a plurality of phase shifters and a plurality of elementary transmitters placed in the arms;

a laser chip, distinct from the photonic chip, comprising a laser source;

wherein:

the laser chip is joined to the photonic chip in a coplanar manner;

the laser source is a flared laser source:

formed of a straight single-mode section and of a section that is flared in a main plane, and that extends along an optical axis and ends in a surface for emission of an optical signal; and configured to emit the optical signal, a wavefront of which is circular in the main plane and centered on a position located in the flared section on the optical axis; and the photonic chip comprises a coupler, configured for optical coupling to the flared laser source and for collecting and transmitting at least one portion of the emitted optical signal, comprising:

a collection input placed facing the emission surface of the flared laser source, and a transmission output comprising N rectilinear waveguides that are coupled to the N arms of the optoelectronic emitter and that are oriented so that longitudinal axes of the N rectilinear waveguides are secant at the position.

2. The optoelectronic emitter as claimed in claim 1, wherein each of the N rectilinear waveguides has an upstream end oriented toward the collection input and an opposite downstream end, the downstream ends defining the transmission output of the coupler and being arranged laterally in a circular arc with a center of a radius of the arc located at the position.

3. The optoelectronic emitter as claimed in claim 2, wherein the coupler is a star coupler comprising:

a free propagation region made of a medium of uniform refractive index, having an entrance face forming the collection input and coupled to the emission surface of the flared laser source, and an exit face that is circularly arcuate and the center of the radius of the arc of which is located at the position; and the N rectilinear waveguides are output waveguides, each connected to the exit face and to the N arms, the downstream ends of which are arranged laterally along a line forming the transmission output that is circularly arcuate with the center of the radius of the are located at the position.

4. The optoelectronic emitter as claimed in claim 3, wherein the output waveguides are tapered waveguides and have a width that decreases from the exit face of the free propagation region.

5. The optoelectronic emitter as claimed in claim 2, wherein the N rectilinear waveguides are tapered waveguides arranged laterally so that their upstream ends are placed along a line forming the collection input and their downstream ends are placed along a line forming the transmission output, the collection input and transmission output being circularly arcuate with the center of the radius of the arc located at the position.

6. The optoelectronic emitter as claimed in claim 1, wherein the photonic chip is spaced apart from the laser chip along the optical axis by a value less than or equal to 1 μm.

7. The optoelectronic emitter as claimed in claim 1, wherein the laser chip and the photonic chip are joined to each other by an adhesive layer.

8. The optoelectronic emitter as claimed in claim 1, wherein the arms are rectilinear and parallel to one another and are connected to the transmission output by connecting segments of various lengths.

9. The optoelectronic emitter as claimed in claim 1, wherein the photonic chip is made from an SOI substrate.

* * * * *